United States Patent
Kim (10) Patent No.: US 10,613,486 B2
(45) Date of Patent: Apr. 7, 2020

(54) METHOD AND COMPUTER PROGRAM FOR CONTROLLING HAZARDOUS FACILITY

(71) Applicant: P&S CO., LTD., Gyeonggi-do (KR)

(72) Inventor: Dae Woo Kim, Gyeonggi-do (KR)

(73) Assignee: P&S CO., LTD, Gyeonggi-do (KR)

( * ) Notice: Subject to any disclaimer, the term of this patent is extended or adjusted under 35 U.S.C. 154(b) by 141 days.

(21) Appl. No.: 15/756,490

(22) PCT Filed: Dec. 3, 2015

(86) PCT No.: PCT/KR2015/013109
§ 371 (c)(1),
(2) Date: Feb. 28, 2018

(87) PCT Pub. No.: WO2017/047871
PCT Pub. Date: Mar. 23, 2017

(65) Prior Publication Data
US 2018/0253068 A1    Sep. 6, 2018

(30) Foreign Application Priority Data

Sep. 15, 2015  (KR) .......................... 10-2015-0130602

(51) Int. Cl.
*G05B 9/02*     (2006.01)
*G06F 21/34*    (2013.01)

(52) U.S. Cl.
CPC .............. *G05B 9/02* (2013.01); *G06F 21/34* (2013.01)

(58) Field of Classification Search
CPC .................................. G05B 9/02; G06F 21/34
See application file for complete search history.

(56) References Cited

U.S. PATENT DOCUMENTS

| 2006/0106471 A1* | 5/2006 | Ikeda ....................... B25J 13/06 |
| | | 700/83 |
| 2007/0205861 A1* | 9/2007 | Nair .................... G07C 9/00111 |
| | | 340/5.61 |
| 2014/0129001 A1* | 5/2014 | Staudenmaier ........ G08B 21/06 |
| | | 700/79 |

FOREIGN PATENT DOCUMENTS

| JP | S59-13009 U | 7/1982 |
| JP | 2007-299228 A | 11/2007 |
| JP | 2008-299734 A | 11/2007 |
| JP | 2009-032032 A | 2/2009 |
| KR | 10-2004-0041906 A | 5/2004 |
| KR | 10-2008-0091912 A | 10/2008 |

(Continued)

OTHER PUBLICATIONS

English Machine Translation KR101418426B1 (Year: 2012).*

(Continued)

*Primary Examiner* — Nabil H Syed
(74) *Attorney, Agent, or Firm* — Miyoung Shin (57) ABSTRACT

Provided is a hazardous facility control method performed by a central server. The hazardous facility control method includes: receiving a maintenance mode setting request and a tag of a worker recognized by a safety device provided in a hazardous facility; authenticating the worker based on the tag; setting, to a locked state, an operation screen of a facility control device capable of controlling the hazardous facility, so as to block another worker from controlling the hazardous facility; and releasing a lock of the safety device so as to allow the worker to access the hazardous facility, and setting a state of the hazardous facility to a maintenance mode.

6 Claims, 3 Drawing Sheets

(56) References Cited

FOREIGN PATENT DOCUMENTS

| KR | 10-2012-0029199 A | 3/2012 |
|---|---|---|
| KR | 10-1418426 B1 | 7/2014 |

OTHER PUBLICATIONS

International Search Report for PCT/KR2015/013109 dated Jun. 30, 2016 and English Translation, 5 pages.
Office action pertaining to Counterpart Japanese Patent Application No. 2018-533588 dated Jun. 18, 2019 and English Translation (5 pages).

* cited by examiner

METHOD AND COMPUTER PROGRAM FOR CONTROLLING HAZARDOUS FACILITY

TECHNICAL FIELD

Embodiments of the present invention relate to methods and computer programs for controlling a hazardous facility.

BACKGROUND ART

Facilities in which hazardous materials are handled threaten the safety of workers during maintenance work. In the case of a gas leak accident that occurred in Gumi on Sep. 27, 2012, a worker accidentally opened a tank valve while the worker was injecting hydrofluoric acid gas into a facility, and thus a gas leak occurred, resulting in the deaths of five workers and injuries to eighteen workers.

In the case of such hazardous facilities, it is now common for other workers to keep watch while a worker is working, so as to prevent a facility from being operated, or a worker begins working after manually stopping the operation of the facility. However, there is always a risk because the access of other workers cannot be fundamentally blocked, and mistakes of workers cannot be blocked. The problem is more serious because a momentary mistake may lead to loss of lives.

Information disclosed in this Background section was already known to the inventors before achieving the present invention or is technical information acquired in the process of achieving the present invention. Therefore, it may contain information that does not form the prior art that is already known to the public in this country.

DETAILED DESCRIPTION OF THE INVENTION

Technical Problem

Embodiments of the present invention provide methods and computer programs for controlling a hazardous facility.

Technical Solution

According to an embodiment of the present invention, a hazardous facility control method performed by a central server includes: receiving a maintenance mode setting request and a tag of a worker recognized by a safety device provided in a hazardous facility; authenticating the worker based on the tag; setting, to a locked state, an operation screen of a facility control device capable of controlling the facility, so as to block another worker from controlling the facility; and releasing a lock of the safety device so as to allow the worker to access the facility, and setting a state of the facility to a maintenance mode.

In the present embodiment, the authenticating may include confirming, based on the tag, whether the worker has rights to access the facility, and authenticating the worker when the worker has the rights to access the facility.

In the present embodiment, an operation of the facility may be stopped when the maintenance mode is set.

In the present embodiment, the blocking may include setting, to a locked state, an operation screen of each of one or more other facilities connected to the facility, so as to block another worker from controlling the one or more other facilities, and the stopping comprises setting each of the one or more other facilities connected to the facility to a minimum operation mode.

In the present embodiment, when the minimum operation mode is set, operations of the one or more other facilities that affect the facility may be stopped, and operations of the one or more other facilities that do not affect the facility may be minimally performed in a preset manner.

In the present embodiment, the hazardous facility control method may further include: receiving a maintenance completion request and the tag of the worker recognized by the safety device; authenticating the worker based on the tag; and releasing the maintenance mode of the facility after checking a safety state of the facility, changing the safety device to a locked state, releasing a lock of the operation screen of each of the hazardous facility and the one or more other facilities, and releasing the minimum operation mode of each of the one or more other facilities.

According to another embodiment, there is provided a computer program stored in a medium, which, when executed by a computer, performs the method described above.

Other aspects, features, and advantages will become apparent from the following drawings, claims, and detailed description of the present invention. These general and specific aspects may be implemented by using a system, a method, a computer program, or any combination of the system, the method, and the computer program.

Advantageous Effects of the Invention

In the methods and systems for controlling a hazardous facility, according to embodiments of the present invention, a central server manages a facility maintenance process of a worker, thus securing the safety of workers and facilities.

BEST MODE

Various alterations and modifications may be made to embodiments, some of which will be illustrated in detail in the drawings and detailed description. Effects, features and methods for achieving the same will become apparent from the following description with reference to the embodiments described in detail with reference to the drawings. The present invention may, however, be embodied in many different forms. in the following embodiments, the terms "first", "second", etc. are not used as a restrictive meaning, but are only used to distinguish one component from another. As used herein, the singular forms "a," "an" and "the" are intended to include the plural forms as well, unless the context clearly indicates otherwise. It will be understood that the terms "comprise", "include", and "have" used herein specify the presence of stated features or elements, but do not preclude the presence or addition of one or more other features or elements. Also, sizes of elements in the drawings may be exaggerated or reduced for convenience of explanation. For example, since sizes and thicknesses of components in the drawings are arbitrarily illustrated for convenience of explanation, the following embodiments are not limited thereto.

Hereinafter, embodiments of the present invention will be described in detail with reference to the accompanying drawings. Like reference numerals are assigned to like elements throughout the drawings and the specification, and redundant descriptions thereof will not be repeated.

Figure 1:
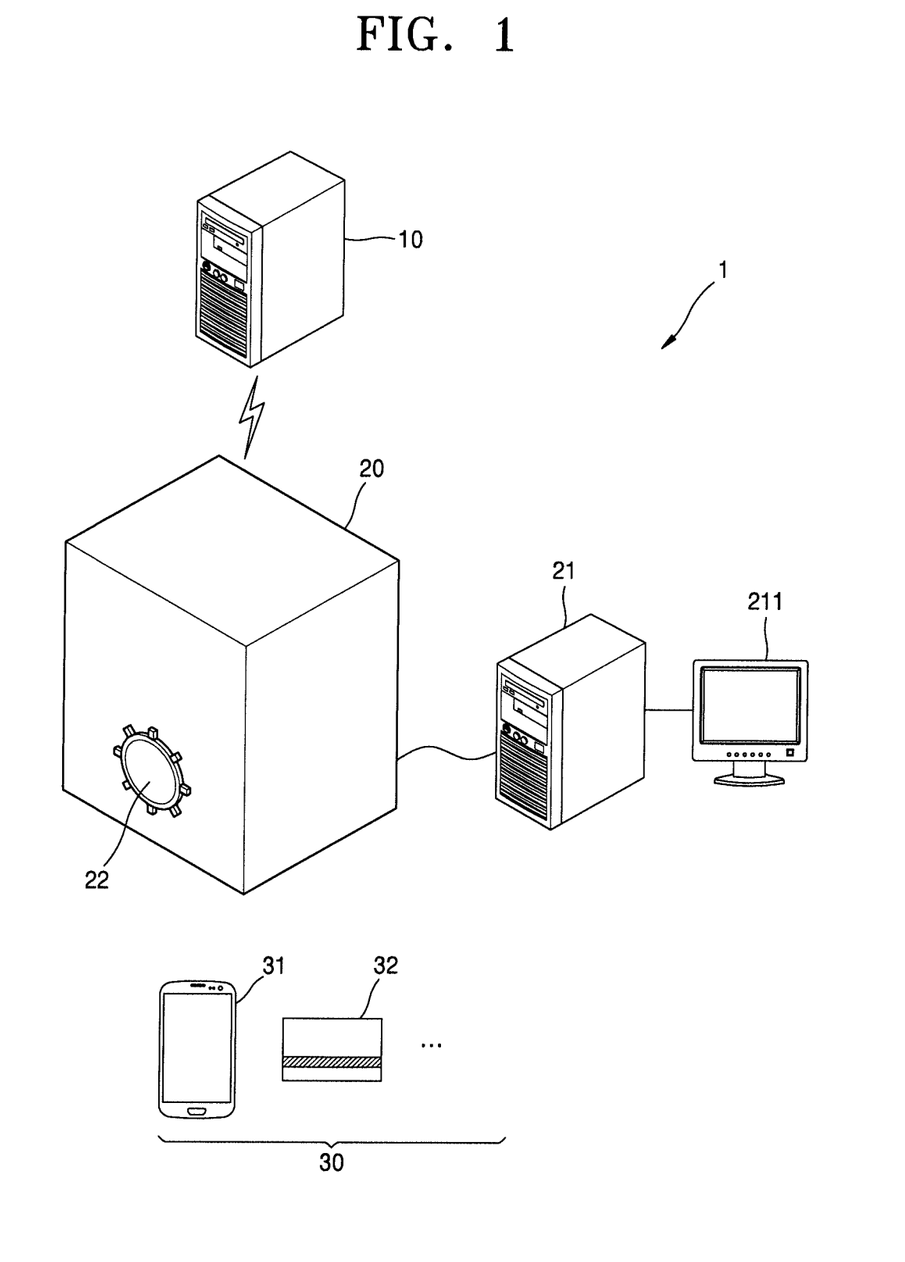
FIG. 1 is a configuration diagram of a hazardous facility control system according to an embodiment of the present invention.

FIG. 1 is a configuration diagram of a hazardous facility control system according to an embodiment of the present invention.

Referring to FIG. 1, the hazardous facility control system 1 according to an embodiment of the present invention includes a central server 10, a hazardous facility 20, and a worker terminal 30. The central server 10 and the hazardous facility 20 communicate with each other through a wired or wireless communication network.

The central server 10 according to an embodiment of the present invention receives worker tag information and a predetermined command from a worker accessing the hazardous facility 20 while communicating with the hazardous facility 20, and controls the hazardous facility 20 based on the worker tag information and the predetermined command. When a maintenance mode setting command is received from the worker, the central server 10 creates a safe environment so that the worker can perform maintenance on the hazardous facility 20. This will be described in more detail with reference to FIG. 2.

Only one hazardous facility 20 is illustrated in FIG. 1, but this is only for convenience of description. The hazardous facility control system according to an embodiment may further include a plurality of facilities. The plurality of facilities may be organically connected to each other, and may be designed so that hazardous materials move therebetween. Although only one server is illustrated in FIG. 1, a plurality of servers may be present according to traffics or data quantity.

The central server 10 collectively controls the safety of the hazardous facility control system 1, monitors the states of the entire facilities included in the hazardous facility control system 1, and checks the safety or unsafety of the entire facilities according to a preset method.

The hazardous facility 20 includes a facility control device 21 that controls the hazardous facility, and a safety device 22 that manages access to the hazardous facility 20. The hazardous facility 20 may include, for example, a tank for storing or transporting hazardous materials, but is not limited thereto.

The facility control device 21 displays an operation screen 211 that enables the worker to directly control the hazardous facility 20. The safety device 22 is a device capable of blocking access to the hazardous facility 20, and may include a detection sensor, a door sensor, a worker tag recognition sensor, and the like. The safety device 22 is normally in a locked state, and the locked state may be released when the worker is authenticated from the central server 20 by recognizing a tag. On the other hand, the worker may access the facility control device 21 without releasing the lock of the safety device 22.

The worker terminal 30 may be provided in any form as long as the worker terminal includes tag information that is recognizable by the safety device 22 provided in the hazardous facility 20. For example, the worker terminal 30 may be a mobile terminal 31 as illustrated in FIG. 1, but the worker terminal 30 may be a card 32 having only identification information. When the worker terminal 30 is the mobile terminal 31, the mobile terminal 31 may be a communication terminal that can use a network service in a wired or wireless communication environment. The mobile terminal 31 is illustrated in FIG. 1 as being a smartphone, but embodiments of the present invention are not limited thereto. Any terminals may be used as the mobile terminal 31 as long as an application capable of communicating with the central server 10 through a network as described above is installed thereon. When the worker terminal 30 is the mobile terminal 31, an additional function may be further provided, as compared with the simple card 32. This will be described in more detail with reference to FIG. 2. Also, embodiments of the present invention will be described on the assumption that the worker terminal 30 is the mobile terminal 31, but the present invention is not limited thereto.

On the other hand, the communication network connecting the central server 10 to the hazardous facility 20 means a communication network configured to provide a connection path that allows devices connected to the communication network to transmit and receive data therebetween. Examples of the communication network may include wired networks, such as local area networks (LANs), wide area networks (WANs), metropolitan area networks (MANs), or integrated service digital networks (ISDNs), and wireless networks, such as wireless LANs, code division multiple access (CDMA), Bluetooth, or satellite communications. However, embodiments of the present invention are not limited thereto. Also, the communication network may connect the central server 10 to the worker terminal 30.

Figure 2:
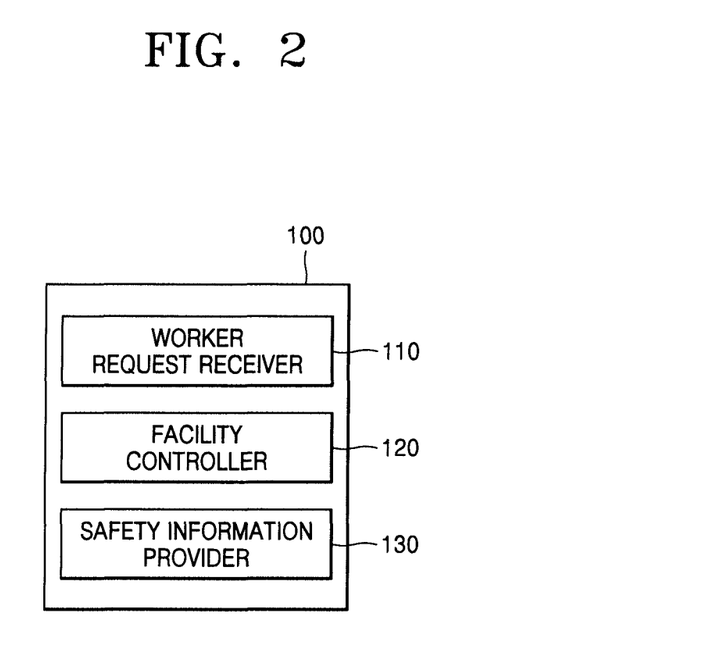
FIG. 2 is a block diagram of a hazardous facility control device 100 according to an embodiment of the present invention.

FIG. 2 is a block diagram of a hazardous facility control device 100 according to an embodiment of the present invention.

The hazardous facility control device 100 according to an embodiment of the present invention may correspond to at least one processor, or may include at least one processor. Accordingly, the hazardous facility control device 100 may be incorporated in another hardware device, such as a microprocessor or a general-purpose computer system. The hazardous facility control device 100 is mounted on the central server 10 illustrated in FIG. 1.

In the hazardous facility control device 100 illustrated in FIG. 2, only elements associated with the present embodiment are illustrated so as to prevent the characteristics of the present invention from being obscured. Therefore, it will be understood by those of ordinary skill in the art that the hazardous facility control device 100 may further include other general-purpose elements besides the elements illustrated in FIG. 2.

Hereinafter, the configuration of FIG. 2 will be described by referring to the configuration and reference numerals illustrated in FIG. 1.

Referring to FIG. 2, the hazardous facility control device 100 according to an embodiment of the present invention includes a worker request receiver 110, a facility controller 120, and a safety information provider 130.

Specifically, the worker request receiver 110 may receive various requests from the worker through the hazardous facility 20. For example, the worker request receiver 110 receives a tag and a maintenance mode setting request of the worker recognized by the safety device 22 provided in the hazardous facility 20. The tag of the worker may be obtained by the safety device 22 when the worker contacts the safety device 22 or when the worker tags the safety device 22 in a non-contact manner. A method by which the safety device 22 obtains the tag of the worker may be designed by a wireless communication method, a barcode method, a magnetic method, an electronic fingerprint recognition method, and the like, but is not limited to a specific method. The command of the worker may be input through the worker terminal 30, or may be input through the operation screen 211 of the facility control device 21 provided in the hazardous facility 20.

When the work of the worker is completed, the worker may recognize the tag in the safety device 22 and input a maintenance completion request. Accordingly, the worker request receiver 110 may receive the tag and the maintenance completion request of the worker recognized by the safety device 22 provided in the hazardous facility 20.

The facility controller 120 controls the hazardous facility 20 and other facility affecting the hazardous facility 20, based on the tag and the command of the worker that are received from the hazardous facility 20.

For example, the facility controller 120 sets the hazardous facility 20 to a maintenance mode based on the tag and the maintenance mode setting request of the worker that are received from the hazardous facility 20. On the other hand, before setting the hazardous facility 20 to the maintenance mode, the facility controller 120 may perform an operation of recognizing the worker by using the tag of the worker.

The worker authentication may be performed by a method of checking whether the worker has rights to access the hazardous facility 20, based on the tag of the worker, and authenticating the worker only when the worker has rights to access the hazardous facility 20. To this end, hazardous facility access rights information for tags of the workers may be prestored in the central server 10.

Also, before setting the facility controller 120 to the maintenance mode, the facility controller 120 can block all dangerous factors that may give danger to the worker while the worker performs maintenance on the hazardous facility 20. For example, the facility controller 120 sets, to a locked state, the operation screen 211 of the facility control device 21 capable of controlling the hazardous facility 20, so as to prevent other workers from controlling the hazardous facility 20. When the operation screen 211 is set to the locked state, a preset lock screen is displayed, and any control commands, except for an emergency control command such as an emergency stop, may not be input. The lock screen displays maintenance related information such as who is performing maintenance on the hazardous facility 20, how many workers are participating in the maintenance, and the like.

The facility controller 120 may set, to a locked state, the operation screen of each of one or more other facilities (not illustrated) connected to the hazardous facility 20, so as to block other workers from controlling the other facility. This is because the hazardous facility 20 may be affected according to the operation of the other facility. The other facility connected to the hazardous facility 20 includes a facility to which hazardous materials included in the hazardous facility 20 can be moved, a facility that can supply hazardous materials to the hazardous facility 20, and a facility that can change the operation state of the hazardous facility 20. The facility controller 120 may set each of one or more other facilities connected to the hazardous facility 20 to a minimum operation mode.

When the other facility is set to the minimum operation mode, the operation of the other facility that may affect the hazardous facility 20 are stopped, and the operation of the facility that does not affect the hazardous facility 20 is minimally operated. This is to reduce energy consumption generated in the process of unnecessarily stopping and restarting the operation of the other facility. The operations that may affect the hazardous facility 20 include, for example, an operation of supplying hazardous materials to the hazardous facility 20, an operation of changing the operation state of the hazardous facility 20, and an operation of changing the internal pressure of the hazardous facility 20. The minimum operation of the other facility that does not affect the hazardous facility 20 may be, for example, an operation of reducing a driving speed. When the other facility is, for example, a robot, the access of the other facility to the hazardous facility 20 is blocked in the minimum operation mode.

The facility controller 120 releases the lock of the safety device 22 and sets the hazardous facility 20 to the maintenance mode, so as to allow the access of the worker to the hazardous facility 20 after blocking the dangerous factor that may give danger to the worker as described above. When the lock of the safety device 22 is released, the worker is allowed to access the inside of the hazardous facility 20.

When the hazardous facility 20 is set to the maintenance mode, the worker stops the operation of the hazardous facility 20 so as to enable the worker to perform maintenance on the hazardous facility 20. Alternatively, the hazardous facility 20 is cleared by moving hazardous materials provided in the hazardous facility 20 to other facility so as to enable the worker to perform maintenance on the hazardous facility 20. Since the maintenance mode corresponds to a mode in which the worker can safely perform maintenance on the hazardous facility 20, details about the state of the hazardous facility 20 in the maintenance mode may be set by various methods.

For example, the facility controller 120 releases the maintenance mode of the hazardous facility 20 based on the tag and the maintenance completion request of the worker that are received from the hazardous facility 20. The worker authentication may be performed in the same manner as described above.

The facility controller 120 may release the maintenance mode of the hazardous facility 20 after checking the safety state of the hazardous facility 20, change the locked state of the safety device 22, and release the lock of the operation screen 211. Meanwhile, when an operation screen of other facility is changed to a locked state or other facility is set to a minimum operation mode while the worker performs maintenance, the facility controller 120 may release the locked state of the operation screen of other facility and release the minimum operation mode of other facility.

The safety information provider 130 provides safety information related to the hazardous facility 20 when the worker is performing maintenance or when the maintenance of the worker is completed, and checks the safety state of the hazardous facility 20 through the worker's response thereto.

For example, the safety information provider 130 may provide the worker terminal 30 or the facility control device 21 with safety requirements that the worker must be fully aware of before starting maintenance, and receive confirmation of all requirements from the worker. Also, when the worker completes the maintenance, the safety information provider 130 may provide the worker terminal 30 or the facility control device 21 with a safety check procedure capable of checking the safety state of the hazardous facility 20 so as to confirm whether the hazardous facility 20 can be operated again, and receive confirmation about all situations from the worker. The facility controller 120 may control the hazardous facility 20 according to the confirmation or non-confirmation of the safety information provider 130.

Hereinafter, various embodiments of the present invention will be described.

According to an embodiment of the present invention, when releasing the lock of the safety device 22 after receiving the maintenance mode setting request of the worker, the facility controller 120 may release the lock stepwise and set the hazardous facility 20 to the maintenance mode stepwise. For example, the maintenance of the hazardous facility 20 may be performed in several steps. The facility controller 120 may divide the step of performing maintenance on the hazardous facility 20 into a plurality of steps, release the lock of the safety device 22 at each step, and set the hazardous facility 20 to the maintenance mode. Specifically, when the step of performing maintenance on the hazardous facility 20 includes steps 1 to 3, the facility controller 120 may release the lock of the safety device 22 to step 1 while the worker performs the maintenance of step 1, set the hazardous facility 20 to a step-1 maintenance mode, release the lock of the safety device 22 to step 2 after confirming that the worker has completed the step-1 maintenance, set the hazardous facility 20 to a step-2 maintenance mode, release the lock of the safety device 22 to step 3 after confirming that the worker has completed the step-2 maintenance, and set the hazardous facility 20 to a step-3 maintenance mode.

When the lock of the safety device 22 is released to step 1, the access to the control devices of the hazardous facility 20 that the worker must access so as to perform the maintenance of step 1 is allowed. When the lock of the safety device 22 is released to step 2, the access to the control devices of the hazardous facility 20 that the worker must access so as to perform the maintenance of step 2 is allowed. When the lock of the safety device 22 is released to step 3, the access to the control devices of the hazardous facility 20 that the worker must access so as to perform the maintenance of step 3 is allowed.

When the hazardous facility 20 is set to the step-1 maintenance mode, dangerous factors that may be imposed on the worker during the maintenance of step 1 are blocked. When the hazardous facility 20 is set to the step-2 maintenance mode, dangerous factors that may be imposed on the worker during the maintenance of step 2 are blocked. When the hazardous facility 20 is set to the step-3 maintenance mode, dangerous factors that may be imposed on the worker during the maintenance of step 3 are blocked. The blocking of the dangerous factors include, for example, blocking access of other workers, locking a valve, interrupting the power supply, shutting off the supply of harmful materials, stopping machine operation, and the like.

Whether the worker's maintenance of a specific step has been completed may be determined according to a result of checking the maintenance result of the specific step that the safety information provider 130 receives from the worker. After the input indicating that the maintenance of the specific step has been completed is received from the worker, the safety information provider 130 may transmit instructions for safety operation to the worker terminal 30. The safety information provider 130 may receive, from the worker terminal 30, whether the worker has performed the instructions, and determine that the maintenance of the specific step has been completed when it is confirmed that the instructions have been all performed.

Alternatively, after the input indicating that the maintenance of the specific step has been completed is received from the worker, the safety information provider 130 may provide safety information related to the specific step, for example, a safety checklist, cases of related accidents, and the like, and may determine that the maintenance of the specific step has been completed when the worker inputs through the worker terminal 30 or the facility control device 21 that the safety information has been all confirmed. At this time, if the worker inputs confirmation of a plurality of checklists and cases excessively quickly, the safety information provider 130 may regard this as a false confirmation and request reconfirmation. This is done for controlling the possibility that the worker will neglect inspection obligation.

When the worker inputs through the worker terminal 30 or the facility control device 21 that the safety information has been all confirmed, the worker terminal 30 or the facility control device 21 provides the safety information provider 130 with information such as worker tag information, work time information, safety information confirmed by the worker, and a result of worker's maintenance. The safety information provider 130 determines whether the maintenance of the specific step has been completed, based on the received information.

According to an embodiment of the present invention, the facility controller 120 may transmit the work procedure of the worker to the worker terminal 30 while the worker performs maintenance, and may assist the maintenance of the worker in such a manner that, when worker inputs the result of the worker's execution of the work procedure, the result of the execution is checked and then a next work procedure is transmitted to the worker terminal 30. Due to this, the worker accurately performs the maintenance work according to the safe work procedure, thus reducing dangerous factors.

According to an embodiment of the present invention, the facility controller 120 may finally confirm the state of the hazardous facility 20 once more immediately before the lock of the safety device 22 is released. That is, the state of the hazardous facility 20 is checked by whether the hazardous facility 20 is in a safe state even if opened, and whether the hazardous facility 20 satisfies a predetermined criteria. To this end, in the step immediately before the facility controller 120 releases the lock of the safety device 22, the safety information provider 130 may provide the worker with the checklist for self check through the worker terminal 30 or the facility control device 21, and receive that all the checklists have been confirmed, from the worker through the worker terminal 30 or the facility control device 21. when all the checklists are confirmed, the facility controller 120 may release the lock of the safety device 22.

MODE OF THE INVENTION

Figure 3:
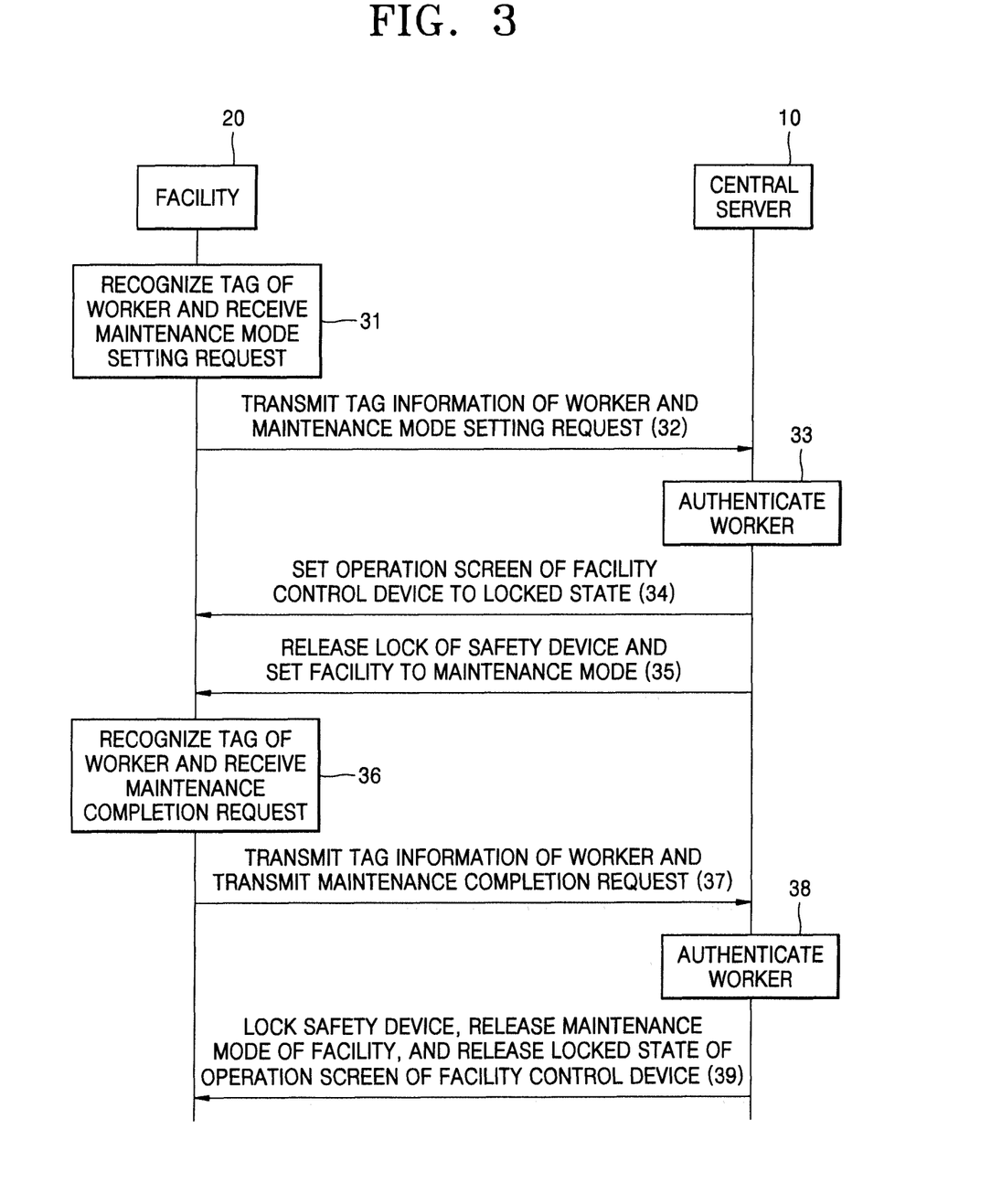
FIG. 3 is a flowchart of a hazardous facility control method according to an embodiment of the present invention.

FIG. 3 is a flowchart of a hazardous facility control method according to an embodiment of the present invention.

The flowchart illustrated in FIG. 3 includes operations processed in time series by the hazardous facility 20 and the central server 10 illustrated in FIG. 1 and the hazardous facility control device 100 illustrated in FIG. 2. Therefore, even though omitted below, the description provided with reference to the configurations of FIGS. 1 and 2 may be applied to the flowchart of FIG. 3.

Referring to FIG. 3, in operation 31, the hazardous facility 20 recognizes the tag of the worker and receives the maintenance mode setting request from the worker. For example, the worker generates the maintenance mode setting request by using an operation screen or an operation button provided in the hazardous facility 20, and recognizes the tag of the worker to the safety device 22 provided in the hazardous facility 20 in a contact or non-contact manner. However, the worker may generate the maintenance mode setting request through the worker terminal 30 held by the worker, and directly transmit the maintenance mode setting request to the central server 10.

In operation 32, the hazardous facility 20 transmits tag information of the worker and the maintenance mode setting request to the central server 10.

In operation 33, the central server 10 confirms whether the worker has access rights, based on the tag information of the worker, and authenticates the worker when the worker has the access rights.

In operation 34, the central server 10 sets the locked state of the operation screen 211 of the facility control device 21 of the hazardous facility 20.

In operation 35, the central server 10 releases the lock of the safety device 22 so as to allow the worker to access the hazardous facility 20, and sets the hazardous facility 20 to the maintenance mode so as to allow the worker to perform maintenance on the hazardous facility 20.

In operation 36, when the maintenance of the worker has been completed, the hazardous facility 20 recognizes the tag of the worker, and receives the maintenance completion request from the worker. For example, the worker generates the maintenance completion request by using an operation screen or an operation button provided in the hazardous facility 20, and recognizes the tag of the worker to the safety device 22 provided in the hazardous facility 20 in a contact or non-contact manner. However, the worker may generate the maintenance completion request through the worker terminal 30 held by the worker, and directly transmit the maintenance completion request to the central server 10.

In operation 37, the hazardous facility 20 transmits tag information of the worker and the maintenance completion request to the central server 10.

In operation 38, the central server 10 confirms whether the worker has access rights, based on the tag information of the worker, and authenticates the worker when the worker has the access rights.

In operation 39, in order to check that the maintenance has been completed and return the hazardous facility 20 to a normal operation state, the central server 10 locks the safety device 22 again, releases the maintenance mode of the hazardous facility 20, and releases the locked state of the operation screen 211 of the facility control device 21.

Although not described with reference to FIG. 3, the description provided in connection with the hazardous facility control device 100 with reference to FIG. 2 may be applied to the flowchart of FIG. 3.

The embodiments set forth herein may be embodied as computer programs that can be executed by various elements on a computer, and these computer programs may be recorded on a non-transitory computer-readable recording medium. Examples of the non-transitory computer-readable recording medium may include magnetic media (e.g., a hard disk, a floppy disk, a magnetic tape, etc.), optical media (e.g., compact disc-read-only memory (CD-ROM), digital versatile disk (DVD), etc.), magneto-optical media (e.g., a floptical disk, etc.), and a hardware device specially configured to store and execute program instructions (e.g., ROM, random access memory (RAM), flash memory, etc.). Further, the medium may include an intangible medium that is implemented in the form that can be transmitted over a network, and may be, for example, a medium in the form of software or an application, which can be transmitted and distributed through a network.

The computer programs may be specifically designed and configured for the present invention, or may be well known to and usable by those of ordinary skill in the field of computer software. Examples of the computer programs may include not only machine language codes prepared by a compiler but also high-level codes executable by a computer by using an interpreter.

The particular implementations shown and described herein are illustrative examples of the present invention and are not intended to otherwise limit the scope of the present invention in any way. For the sake of brevity, conventional electronics, control systems, software, and other functional aspects of the systems may not be described in detail. Furthermore, the connecting lines or connecting members shown in the various figures are intended to represent exemplary functional relationships and/or physical or logical connections between the various elements. It should be noted that many alternative or additional functional relationships, physical connections or logical connections may be present in a practical apparatus. Moreover, no component is essential to the practice of the embodiments unless the element is specifically described as "essential" or "critical".

Accordingly, the spirit of the present invention should not be limited to the above-described embodiments, and the appended claims and all ranges equivalent to the claims or equivalently modified therefrom will belong to the spirit of the present invention.

INDUSTRIAL APPLICABILITY

Embodiments of the present invention may be used for methods and computer programs for informing a hazardous facility.

The invention claimed is:

1. A hazardous facility control method performed by a central server, the hazardous facility control method comprising:
 receiving a maintenance mode setting request and a tag of a worker recognized by a safety device provided in a hazardous facility;
 authenticating the worker based on the tag;
 setting, to a locked state, an operation screen of a facility control device capable of controlling the hazardous facility, so as to block another worker from controlling the hazardous facility; and
 releasing a lock of the safety device so as to allow the worker to access the hazardous facility, and setting a state of the hazardous facility to a maintenance mode,
 wherein said setting the operation screen comprises setting the operation screen of each of one or more other facilities connected to the hazardous facility to a locked state, so as to block another worker from controlling the one or more other facilities, and
 wherein said releasing the lock of the safety device comprises setting each of the one or more other facilities connected to the hazardous facility to a minimum operation mode.

2. The hazardous facility control method of claim 1, wherein said authenticating the worker based on the tag comprises confirming, based on the tag, whether the worker has rights to access the hazardous facility, and authenticating the worker when the worker has the rights to access the hazardous facility.

3. The hazardous facility control method of claim 1, wherein an operation of the hazardous facility is stopped when the maintenance mode is set.

4. The hazardous facility control method of claim 1, wherein, when the minimum operation mode is set, operations of the one or more other facilities that affect the hazardous facility are stopped, and operations of the one or more other facilities that do not affect the hazardous facility are minimally performed in a preset manner.

5. The hazardous facility control method of claim 1, further comprising:
   receiving a maintenance completion request and the tag of the worker recognized by the safety device;
   authenticating the worker based on the tag; and
   releasing the maintenance mode of the hazardous facility after checking a safety state of the hazardous facility, changing the safety device to a locked state, releasing a lock of the operation screen of each of the hazardous facility and the one or more other facilities, and releasing the minimum operation mode of each of the one or more other facilities.

6. The hazardous facility control method of claim 1, further comprising:
   receiving a maintenance completion request and the tag of the worker recognized by the safety device;
   authenticating the worker based on the tag; and
   releasing the maintenance mode of the hazardous facility after checking a safety state of the hazardous facility, changing a locked state of the safety device, and releasing the locked state of the operation screen.

\* \* \* \* \*